United States Patent Office 2,695,295
Patented Nov. 23, 1954

2,695,295

UNSYMMETRICAL N,N'-SUBSTITUTED ETHYLENEDIAMINE AND PIPERAZINE COMPOUNDS

Ansel P. Swain, Springfield Township, Montgomery County, Pa., assignor to McNeil Laboratories, Incorporated, Philadelphia, Pa., a corporation of Pennsylvania No Drawing. Application December 19, 1952, Serial No. 327,045

6 Claims. (Cl. 260—268)

The present invention relates to novel chemical compounds and to the method of preparing the same; and, more particularly, it relates to unsymmetrical N,N'-disubstituted ethylenediamine compounds possessing valuable sympatholytic properties.

There are mentioned in the literature and available on the market certain chemical compounds which possess sympatholytic properties, that is, they have the ability to prevent the actions of epinephrine and similar neurohormones in the human body and are able to diminish or prevent the activity of the sympathetic nervous system. These agents possess certain limitations, however, which severely restrict their field of use. Benzodioxanylmethyl piperidine, benzodioxanylmethyl diethylamine, and benzodioxanylmethyl piperazine, for example, can only be administered by injection and have only transient effects against circulating epinephrine. Such compounds are not usefully effective in blocking the sympathetic nervous system and are toxic at the levels that are only partially effective; they are not active on oral administration. Other compounds, while possessing more definite sympatholytic properties, are limited to administration by injection since they have an irritating or corrosive effect on the stomach and intestinal wall if taken orally.

An important advantage of the novel compounds of the present invention is that they do not produce the toxic effects that have been observed following either parenteral or oral administration of other sympatholytic agents; that is, they do not produce nausea, vomiting, tissue irritation, coronary constriction, and the like effects on the heart, blood vessels and viscera.

The principal object of the present invention is to provide new chemical compounds possessing advantageous pharmaceutical properties.

Another object of the invention is to provide chemical compounds possessing valuable sympatholytic properties, which can be administered orally as well as by injection.

A further object is to provide chemical compounds which are effective in blocking the sympathetic nervous system as well as injected epinephrine and which may be administered orally as well as by injection for these purposes.

Other objects, including the provision of a method of making the novel compounds, will be apparent from a consideration of this specification and the claims.

In copending applications of Ansel P. Swain Serial Number 327,043 and 327,044, both filed December 19, 1952, are disclosed and claimed compounds related to those of the present invention as well as the method of preparing them, and reference may be made, if desired, to said copending applications as amplifying the present disclosure.

The novel compounds of the present invention are unsymmetrical N,N'-disubstituted ethylenediamine compounds having the following fundamental structural formula:

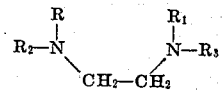

where R and R$_1$ are selected from the group consisting of hydrogen and a joined dimethylene linkage to complete the piperazine ring

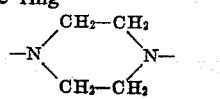

where R$_2$ is selected from a phenyl group

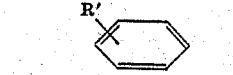

and a 1,4-benzodioxan-2-ylmethyl group

where R$_3$ is selected from a phenyl group

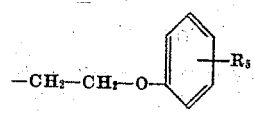

and a 2-phenoxyethyl group $-CH_2-CH_2-O-$⟨ring with R$_5$⟩ where R', R$_4$ and R$_5$ are selected from the group consisting of hydrogen, methyl and methoxy, R$_3$ being a phenyl group only when N$_2$ is a 1,4-benzodioxyanylmethyl group.

The products of the present invention thus comprise three closely related groups of compounds, namely, N-(1,4-benzodioxan-2-ylmethyl)-N'-phenyl ethylenediamine compounds having the formula:

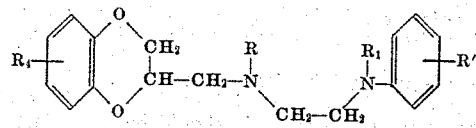

the N-(1,4-benzodioxan-2-ylmethyl)-N'-(2-phenoxyethyl) ethylenediamine compounds having the following formula:

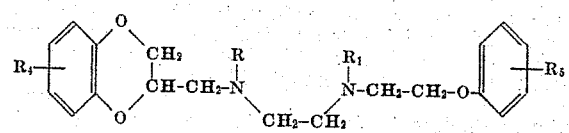

and the N-phenyl-N'-(2-phenoxyethyl) ethylenediamine compounds having the formula:

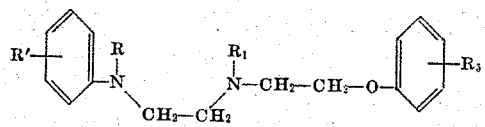

where R$_4$, R$_5$ and R' are selected from the group consisting of hydrogen, methyl and methoxy and where R and R$_1$ are selected from the group consisting of hydrogen and a joined dimethylene linkage (—CH$_2$—CH$_2$—) to complete the piperazine ring

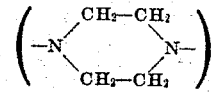

From the standpoint of optimum sympatholytic activity, the preferred compounds are those in which R and R$_1$ join through a dimethylene linkage to complete the piperazine ring; and, hence, the preferred compounds are the N,N'-disubstituted piperazine compounds corresponding to the above formulae.

Referring to R$_4$, R$_5$ and R' in the above formulae, the exact position of this group, when methyl or methoxy on the benzene ring is not critical and it may be on any available position, or the product may even be made up of a mixture of compounds differing as to the position of the R$_4$, R$_5$ or R' groups.

The compounds of the present invention all possess valuable sympatholytic properties that are effective in blocking epinephrine and other neurohormones whether the latter be injected or elaborated physiologically in the body. The compounds find particular utility, in addition to known uses for sympatholytic agents, in the treatment of hypertension. Moreover, the compounds can readily be administered orally without being toxic or producing other deleterious physiological effects, and are effective for the stated purposes when so administered. The compounds will range in activity from that of prior available sympatholytic agents to an activity many times greater, particularly when compared on oral administration.

In the compounds of the present invention, there are two basic nitrogens to which one or two equivalents of acid may be added to form a mono- or di salt. Hence, the compounds of the invention may be prepared and/or employed either as the base or as a salt. Thus, for example, the structural formula for the dihydrochlorides of the compounds of the present invention may be written as follows:

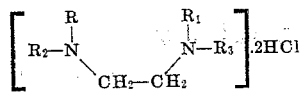

In view of the fact that the salts differ from the bases only in the addition of the acid to one or both of the nitrogen atoms referred to, and are characterized by the same fundamental structural formula, the salts as well as the bases are included within the scope of this application and of the claims wherever reference is made to a compound comprising a defined fundamental structural formula.

The acid forming the salt may be any inorganic or organic acid desired, for example, hydrochloric, hydrobromic, hydroiodic, nitric, sulphuric, phosphoric, and the like; acetic, proprionic, caproic, stearic, and other acids of this series, and the like; crotonic, oleic, oxalic, citric, tartaric, lactic, benzoic, naphthoic, picric, salicyclic, dilituric, methane sulphonic, camphor sulphonic, and the like. If a salt is to be administered any toxicity which may be imparted by the acid should be taken into consideration as well known in the art.

The compounds of the present invention may be readily prepared by reacting one mole of an ethylenediamine base, or a salt or hydrate thereof, with one mole of a compound providing the desired $R_2$ group, following which one mole of the resulting N-substituted ethylenediamine product may be reacted with a mole of compound providing the desired $R_3$ group. Of course, if the N-substituted ethylenediamine possessing the desired $R_2$ or $R_3$ group is available, it may merely be reacted with one mole of a compound providing the remaining $R_2$ or $R_3$ group to provide the desired product, and this is the preferred method in the case of the phenylpiperazine compounds. Where, in the final product, $R_2$ is to be a benzodioxyanylmethyl group and $R_3$ is to be a phenyoxyethyl group, the product may be prepared by reacting one mole of an ethylenediamine (base, hydrate or salt) with one mole of the desired benzodioxyanylmethyl halide, sulfate, or phosphate, and then with one mole of the desired 2-phenoxyethyl halide, sulfate, or phosphate. The order of the reactions is immaterial. When either $R_2$ or $R_3$ is to be a phenyl group, and R and $R_1$ are to form a joined dimethylene linkage completing the piperazine ring, it is preferred first to prepare the phenyl piperazine, as by reacting a salt, for example, the hydrochloride of aniline or appropriate methyl- or methoxy-substituted aniline with a salt, such as the hydrochloride, of diethanolamine. References have been made above to halide derivatives of the various reactants, and these may be suitable chlorine, bromine, iodine, and the like, derivatives.

In preparing the N-substituted ethylenediamine, that is, in carrying out the first reaction step discussed above, it may be desirable, in order to prevent reaction occurring at both nitrogen atoms, initially to provide a readily removable blocking group at one of the nitrogen atoms on the diamine. Examples of such blocking groups are the carboalkoxy groups, such as the carbethoxy group ($C_2H_5OOC-$) and the carbobenzyloxy group. The presence of such a group insures the formation of the desired N-substituted ethylenediamine product of the first reaction step. Following this reaction step, the blocking group may be removed, as by hydrolysis, and the second reaction step carried out to provide the final N,N'-disubstiuted ethylenediamine compound.

The reaction between the ethylenediamine compound and the compounds providing the desired $R_2$ and $R_3$ groups may be carried out in alkaline aqueous- or alcoholic medium. When an aqueous medium is employed, the alkali used is advantageous sodium hydroxide, and when an alcoholic medium is employed, the alkali used is advantageously sodium carbonate. It is desirable to heat the reaction mixture until the reaction is complete, and in this connection refluxing is preferred. After the reaction is as complete as desired, the product may be conveniently separated from the reaction mixture by removal of part or all of the solvent used, or by filtration if the product is a solid. If the product is liquid, it may be removed by extraction with a suitable solvent such as ether. In isolating the product, it may be desirable to recover it as a salt and this may be accomplished by treating the reaction product or an extract thereof with a suitable acid of the type discussed hereinabove.

The following examples serve to illustrate further the present invention.

*Example I*

A mixture of 29.0 g. (0.18 gram mole) of N-phenyl-piperazine (prepared by heating together aniline and diethanolamine hydrochlorides at 180–190° C. for 6–8 hours, making the reaction mixture alkaline, extracting with ether and fractionally distilling the residue after removal of the solvent ether), 36.5 g. (0.2 gram mole) of 2-chloromethyl-1,4-benzodioxan, and 7.2 g. (0.18 gram mole) of sodium hydroxide in 7.2 ml. of water is heated at 100–110° C. for 62 hours. The solid which separates on cooling is washed with water and crystallized from a mixture of acetone and water to give lustrous crystals melting at 81.5–82° C. The calculated N content of $C_{19}H_{22}N_2O_2$ is 9.0; that found is 8.8. The compound is N-(1,4-benzodioxan-2-ylmethyl)-N'-phenyl-piperazine having the formula:

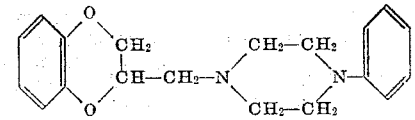

By substituting N-phenyl-ethylenediamine for the N-phenylpiperazine in the above procedure, N-(1,4-benzodioxan-2-ylmethyl)-N'-phenylethylenediamine may be prepared.

Likewise by substituting N-(ortho-, meta-, or para-methylphenyl) piperazine orethylenediamine and N-(ortho-, meta-, or para-methoxyphenyl) piperazine or ethylenediamine, respectively, for the N-phenylpiperazine, the corresponding N-methylphenyl- and N-methoxyphenyl- piperazine or ethylenediamine products may be prepared; while the corresponding N-methyl-1,4-benzodioxan-2-ylmethyl) or N-(methoxy-1,4-benzodioxan-2-ylmethyl) products may be prepared by substituting the 5-, 6-, 7- or 8-methyl- or methoxy derivatives of 2-chloromethyl-1,4-benzodioxan for the 2-chloromethyl-1,4-benzodioxan of this example.

*Example II*

A mixture of 2.7 g. (0.01 gram mole) of N-(1,4-benzodioxan-2-ylmethyl) piperazine hydrochloride, 2.0 g. (0.01 gram mole) of 2-phenoxyethyl bromide, 2.1 g. (0.02 gram mole) of anhydrous sodium carbonate, and 250 ml. of methanol is refluxed for 58 hours. The inorganic salts are removed by filtration and washed with methanol. The addition of anhydrous hydrogen chloride to the filtrate followed by evaporation of the resulting solution causes a white solid to separate. On crystallization from a mixture of methanol and ether, white crystals melting at 238–242° C., are obtained. The calculated N content for $C_{21}H_{28}Cl_2N_2O_3$ is 6.5; that found is 6.5. The compound is N-(1,4-benzodioxan-2-ylmethyl)-N'-(2-phenoxyethyl) piperazine dihydrochloride having the formula:

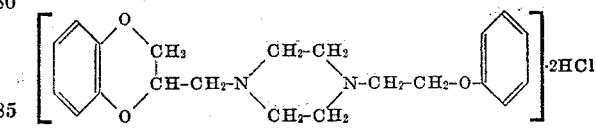

By substituating 2-(ortho-, meta-, or para-methylphenoxy) ethyl bromide or 2-(ortho-, meta-, or para-methoxyphenoxy) ethyl bromide for the 2-phenoxyethyl bromide in the above reaction, the corresponding N-(1,4-benzodioxan-2-ylmethyl)-N'-[2-methylphenoxy) ethyl] piperazine and N-(1,4-benzodioxan-2-ylmethyl)-N'-[2-methoxyphenoxy) ethyl] piperazine compounds, respectively, may be prepared.

By substituting 5-, 6-, 7- or 8-methyl- or methoxy derivatives of N-(1,4-benzodioxan-2-ylmethyl) piperazine hydrochloride for the N-(1,4-benzodioxan-2-ylmethyl) piperazine hydrochloride of this example, the corresponding products may be prepared. Likewise, as in Example I, the corresponding 1,4-benzodioxan-2-ylmethyl ethylenediamine hydrochlorides may be used to provide the corresponding N-(1,4-benzodioxan-2-ylmethyl)-N'-(2-phenoxyethyl) ethylenediamine products.

*Example III*

A mixture of 5.1 g. (0.0315 gram mole) of N-phenylpiperazine, 6.3 g. (0.0315 gram mole) of 2-phenoxyethyl bromide and 1.3 g. (0.0315 gram mole) of sodium hydroxide in 4 ml. of water is refluxed for 3.5 hours. The solid which forms on cooling is pulverized in water and collected by filtration. After two crystallizations from a mixture of acetone and water, white platelets of the monohydrate are obtained which melt at 80–81° C. The calculated N content for $$C_{18}H_{22}N_2O \cdot 1H_2O$$

is 9.3; that found is 9.2.

When melted under vacuum, the above compound loses its molecule of water to give the anhydrous compound melting at 80–81° C. The calculated N content for $C_{18}H_{22}N_2O$ is 9.9; that found is 9.9.

The compound is N-phenyl-N'-(2-phenoxyethyl) piperazine having the formula:

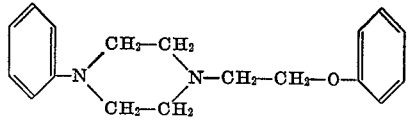

By substituting 2-(ortho-, meta-, or para-methylphenoxy) ethyl bromide or 2-(ortho-, meta-, or para-methoxyphenoxy) ethyl bromide for the 2-phenoxyethyl bromide in the above reaction, the corresponding N-phenyl-N'-[2-methylphenoxy) ethyl] piperazine and N-phenyl-N'-[2-methoxyphenoxy) ethyl] piperazine compounds, respectively, may be prepared. Likewise, by substituting N-methylphenylpiperazine or N-methoxyphenylpiperazine for the N-phenylpiperazine, the corresponding N-methylphenyl- and N-methoxyphenyl-N'-(2-phenoxyethyl) piperazine products, respectively, may be prepared. And, as in Example I, the corresponding N-phenylethylenediamines may be substituted for the N-phenylpiperazine to prepare the corresponding N-phenyl-N'-(2-phenoxyethyl) ethylenediamine products.

Considerable modification is possible in the selection of various substituents and combinations thereof, as well as in the particular procedures followed in preparing the compounds without departing from the scope of the present invention.

I claim:
1. Unsymmetrical N, N'-disubstituted ethylenediamine compounds having the following fundamental structural formula:

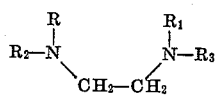

where R and $R_1$ are selected from the group consisting of hydrogen and a joined dimethylene linkage —CH$_2$—CH$_2$— to complete the piperazine ring

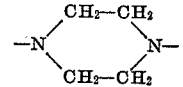

where $R_2$ is selected from a phenyl group

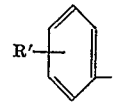

and a 1,4-benzodioxan-2-ylmethyl group

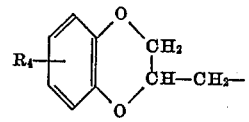

and where $R_3$ is selected from a phenyl group

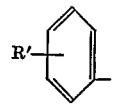

and a 2-phenoxyethyl group

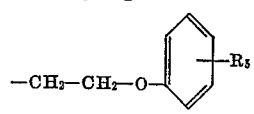

$R_3$ being a phenyl group only when $R_2$ is a 1,4-benzodioxan-2-ylmethyl group, $R_4$, $R_5$ and $R'$ in the above formulae being selected from the group consisting of hydrogen, methyl and methoxy.

2. N - (1,4 - benzodioxan - 2 - ylmethyl) - N' - phenyl-piperazine.

3. N - (1,4 - benzodioxan - 2 - ylmethyl) - N' - (2-phenoxyethyl) piperazine.

4. N - phenyl - N' - (2 - phenoxyethyl) piperazine.

5. N - (1,4 - benzodioxan - 2 - ylmethyl) - N' - (2-phenoxyethyl) ethylenediamine.

6. N - (1,4 - benzodioxan - 2 - ylmethyl) - N' - phenyl-ethylene-diamine.

No references cited.